United States Patent [19]

Gallup et al.

[11] Patent Number: 5,409,614
[45] Date of Patent: * Apr. 25, 1995

[54] CONTROL OF SCALE DEPOSITION IN GEOTHERMAL OPERATIONS

[75] Inventors: Darrell L. Gallup, Chino; John L. Featherstone, El Centro, both of Calif.

[73] Assignee: Union Oil Company of California, Los Angeles, Calif.

[*] Notice: The portion of the term of this patent subsequent to Feb. 22, 2011 has been disclaimed.

[21] Appl. No.: 93,097

[22] Filed: Jul. 16, 1993

Related U.S. Application Data

[63] Continuation-in-part of Ser. No. 861,323, Mar. 31, 1992, Pat. No. 5,288,411, which is a continuation-in-part of Ser. No. 717,527, Jun. 19, 1991, Pat. No. 5,268,108.

[51] Int. Cl.[6] .............................................. C02F 5/14
[52] U.S. Cl. ........................ 210/700; 60/641.5; 75/712; 75/733; 166/267; 210/701; 210/713; 210/727; 210/734; 210/747; 588/17
[58] Field of Search ............... 60/641.2, 641.5; 75/712, 726, 732, 733, 736; 166/267, 310; 210/696–701, 713, 714, 719, 723, 726, 728, 734, 747; 252/631, 633

[56] References Cited

U.S. PATENT DOCUMENTS

| | | | |
|---|---|---|---|
| 3,336,221 | 8/1967 | Ralston | 210/700 |
| 3,663,448 | 5/1972 | Ralston | 210/700 |
| 3,958,635 | 5/1976 | Zilch et al. | 210/700 |
| 4,032,460 | 6/1977 | Zilch et al. | 252/8.55 B |
| 4,176,057 | 11/1979 | Wheatley et al. | 210/638 |
| 4,328,106 | 5/1982 | Harrar et al. | 210/700 |
| 4,475,595 | 10/1984 | Watkins et al. | 166/303 |
| 4,476,930 | 10/1984 | Watanabe | 166/279 |
| 4,500,434 | 2/1985 | Jost et al. | 210/696 |
| 4,510,059 | 4/1985 | Amjad et al. | 210/701 |
| 4,537,684 | 8/1985 | Gallup et al. | 210/696 |
| 4,728,438 | 3/1988 | Featherstone et al. | 210/747 |
| 4,756,888 | 7/1988 | Gallup et al. | 423/42 |
| 4,765,913 | 8/1988 | Featherstone et al. | 210/747 |
| 4,830,766 | 5/1989 | Gallup et al. | 252/8.552 |
| 4,869,066 | 9/1989 | Pye et al. | 60/641.5 |
| 4,933,090 | 6/1990 | Gill et al. | 210/701 |
| 5,044,439 | 9/1991 | Cenegy et al. | 210/701 |
| 5,049,297 | 9/1991 | Morris et al. | 210/696 |
| 5,073,270 | 12/1991 | Gallup et al. | 210/698 |
| 5,082,492 | 1/1992 | Gallup et al. | 210/719 |
| 5,098,578 | 3/1992 | Gallup | 210/696 |
| 5,145,515 | 9/1992 | Gallup et al. | 75/712 |
| 5,145,656 | 9/1992 | Gallup et al. | 423/42 |
| 5,240,687 | 8/1993 | Gallup et al. | 423/42 |
| 5,246,593 | 9/1993 | Gallup | 210/709 |
| 5,254,225 | 10/1993 | Gallup | 204/105 |
| 5,256,301 | 10/1993 | Gallup et al. | 210/696 |
| 5,268,108 | 12/1993 | Gallup et al. | 210/698 |
| 5,288,411 | 2/1994 | Gallup et al. | 210/700 |

OTHER PUBLICATIONS

"Antiscalant Trial at Kawerau Geothermal Field," by Q. J. Robson and L. Stevens, Proc. 11th New Zealand Geothermal Workshop, 1989, pp. 165–168.

Primary Examiner—Peter A. Hruskoci
Attorney, Agent, or Firm—Charles L. Hartman; William O. Jacobson; Gregory F. Wirzbicki

[57] ABSTRACT

NORMs are inhibited or prevented from precipitating with scale produced by a hot aqueous solution by adding multiple portions of a crystal structure modifier to the aqueous solution as it cools before and during removal of silicon containing components by precipitation. Preferred crystal structure modifiers include polyacrylate crystal structure modifiers and phosphonomethylated amines.

31 Claims, 7 Drawing Sheets

CONTROL OF SCALE DEPOSITION IN GEOTHERMAL OPERATIONS

This Application is a continuation-in-part of U.S. patent application Ser. No. 861,323, filed Mar. 31, 1992, now U.S. Pat. No. 5,288,411 hereby incorporated in full by reference, itself a continuation-in-part of U.S. patent application Ser. No. 717,527, now U.S. Pat. No. 5,268,108 filed Jun. 19, 1991, hereby incorporated in full by reference.

BACKGROUND OF THE INVENTION

1. Field of the Invention

This invention relates to methods for inhibiting or preventing the deposition of alkaline earth scale from aqueous waste streams derived by utilizing resources derived from the earth. This invention relates particularly to methods of inhibiting or preventing the precipitation and inclusion of radioactive minerals in scale derived from waste aqueous streams, as well as preventing premature deposition of scale in the waste water disposal injection wells.

2. State of the Art

Many processes to obtain resources from the earth, for example, mining and oil production, result in the co-production of hot aqueous liquids. The most straight foreword of these processes is the production of geothermal brine to obtain energy therefrom.

Geothermal fluids contain thermal energy in vast amounts, which can be used to produce electrical power. In one process for producing electrical power, a naturally pressurized, hot substantially liquid geothermal brine is recovered, then suddenly depressurized, or, as termed herein, flashed. This cools the liquid brine while reducing its pressure and converting some of the brine to steam used to power steam turbine generators. The cooled geothermal brine is processed further and then typically injected into the ground to replenish the aquifer and prevent ground subsidence.

The hot, highly saline brine used to generate power is saturated or nearly saturated in many ions and minerals. As the brine is flashed many of these ions and minerals precipitate out. Some minerals, typically silicon-containing compounds, particularly silica and silicate-containing minerals, such as iron silicate, form small particles that precipitate slowly. The slow precipitation means that these already precipitating minerals form solids that plug the downstream fluid handling and injection apparatus. Therefore, it is greatly preferred to force these slowly precipitating solids out of the liquid before injection using a flocculent added to the brine in a clarification process. U.S. Pat. No. 4,874,529, issued to Featherstone, which Patent is hereby incorporated in full by reference, discusses the problem of slowly precipitating fine particulates and describes the solution of adding a flocculating agent to the secondary clarification zone as the solution to the problem.

However, not all minerals precipitate from the brine solution slowly. Alkaline earth salts, for example, barium sulfate, also known as barite, and calcium fluoride are among the minerals frequently found in significant concentrations in geothermal brines. Alkaline earth salts tend to precipitate fairly quickly. During the flashing step alkaline earth sulfates (for example, barium sulfate) start to precipitate and continue precipitating down-stream during further handling of the brine as it continues to cool. Barium sulfate presents an annoying problem in many geothermal systems since it starts to precipitate when the cooling brine is still as hot as 340° F., a temperature produced early on in the energy production process, triggering the early precipitation of barium sulfate. Now, the precipitation of barium sulfate has been implicated in a more serious precipitation problem.

Recently, it has been noticed that the crystalline material precipitated at some geothermal sites becomes more radioactive as the site ages. The radioactivity, contained in naturally occurring radioactive materials, or NORMs, is believed to result from tapping into new subterranean formations containing trace amounts of a radioactive alkaline earth sulfate—radium sulfate—which apparently coprecipitates with the chemically similar barium sulfate. It is important to reduce the levels of NORMs in the material that precipitates during the clarification process on the processing equipment to as low a level as possible.

In view of the foregoing, it can be seen that the exemplary hot aqueous liquid, geothermal brines, contain dissolved components that often cause processing problems. Other hot aqueous liquids produced from mines and oil wells, among other sources, cause similar problems. All these hot aqueous liquids contain unwanted components that are best left in the solution for subsequent disposal by injection into the earth while also containing unwanted components that are best removed as quickly as possible from the aqueous stream to avoid scaling and contamination of the processing equipment. The NORMs, which are associated with barium sulfate, contaminate the scale formed with radioactive components. However, even though the precipitation of NORMs from the brine stream is to be avoided, the precipitation of silicon-containing components, including silica and silicates, is required for smooth process operation. Consequently, the precipitation of the silicon containing components is induced in at least one clarification vessel by the addition of a flocculating agent.

SUMMARY OF THE INVENTION

In the present invention, additives which reduce the level of NORMs associated with alkaline earth compounds in solids deposited from naturally produced aqueous liquids, such as geothermal brines, have been discovered to be particularly effective if added at particular points in the processing scheme. The additives are added to the brine at locations selected so that nucleation of dissolved alkaline earth salts is continuously prevented throughout the processing scheme, while allowing the silicon-containing components to be removed from solution by flocculation and precipitation in a clarification zone. Such sequential addition prevents the nucleation of alkaline earth crystalline salts throughout the process while the silicon components are forced to precipitate as desired from the aqueous liquid in the clarification zone. The alkaline earth salts present in the aqueous liquid, including those implicated in NORMs deposition, remain suspended in the aqueous solution during its residence in the clarification zone while the silicon containing components are precipitating. The recovered aqueous liquid can then be injected into the earth to dispose of the NORMs.

In this invention, at least a first portion of additives for inhibiting NORMs deposition (and other alkaline earth salts) is added before the clarifier zone and a second portion is added to the clarification zone. A first portion of crystal structure modifier is introduced to the liquid as soon as the temperature of the aqueous liquid is low enough that it will not thermally deactivate the additive, which, in normal operation, is usually about the same place where the dissolved alkaline earth crystalline salts first start to nucleate, forming a precipitatable solid. The brine is then introduced into a clarification zone, where flocculent is added to force the silicon containing components to deposit from the aqueous solution. A second portion of a crystal structure modifier is added to the brine in the clarification zone. The second portion of crystal structure modifier prevents nucleation of alkaline earth crystals and stops further crystal growth during the prolonged residence time the brine must spend in the clarifier to allow silicon containing components time enough to precipitate from the brine.

In one particularly preferred embodiment of this invention, a geothermal brine is flashed and the remaining liquid portion processed through a clarification zone having two, or more, sequential clarification stages. Although the second portion of crystal structure modifier can be added to each of the several clarification stages, it is preferred to add it between first stage (hereinafter termed the "primary clarifier") and the second stage (hereinafter termed the "secondary clarifier"). Addition of crystal structure modifier to the brine in the clarification zone has been discovered to effectively prevent precipitation of alkaline earth salts, both in the clarifiers and downstream before the injection well. Moreover, the dual addition (contrasted with the first addition, only) of crystal structure modifier provides significant improvement in the quality of the liquid ultimately removed from the clarification zone for disposal. The liquid removed from the clarification zone has a substantially reduced content of silicon-containing components, but contains a substantial proportion of the NORMs originally contained in said feed aqueous liquid. This recovered liquid is processed further and, ultimately, injected into the earth. As usually practiced, this invention provides for the addition of three separate portions of additives: the first two additions as discussed above, and the third just before injection into the earth, to prevent further crystal growth of alkaline earth salts in the injection wells.

As is apparent, the additive is present in the brine entering a clarification stage where a flocculent is added to accelerate precipitation of silicon containing components. However, surprisingly, neither the inhibitors nor the flocculent affect the desired action of the other class of additives. Thus, the invention provides for a selective process where the desired deposition of silicon, silicates, and other silicon-containing components occurs in a clarification stage while the precipitation of NORMs is prevented or inhibited. This process is general and can be used where ever a silicon component containing and NORMs containing aqueous solution is produced from a resource retrieval operation which must be disposed of. Examples of such solutions are those produced, for example, in geothermal plants, mining operations and oil field operations.

In this invention the preferred crystal structure modifiers are the phosphonoalkylated amines. Other potential crystal structure modifiers include polyphosphonic acids, aminoalkyl phosphonates, phosphate esters, and phosphonocarboxylate.

Accordingly, in light of the foregoing, the discoveries can be used to advantage in a typical geothermal operation, a mining operation, or an oil field operation where brine is sequentially recovered from a subterranean formation, clarified of non-alkaline earth compounds, such as silica-containing solids, and ultimately injected back into the formation. In a preferred embodiment of the invention a high temperature geothermal brine is flashed to produce steam. This reduces the pressure and cools the remaining liquid brine. After flashing the alkaline earth minerals, including a barium sulfate/radium sulfate coprecipitate, start to precipitate out of the cooled brine. A crystal structure modifier, usually comprising a phosphonoalkylated amine, is added to the cooled brine. It has been discovered that especially good results can he obtained in a geothermal operation that uses a two stage clarification zone by adding more crystal structure modifier to the brine processing stream: (a) where the alkaline earth salts first start to nucleate, (b) between the primary clarification stage and the secondary clarification stage, and (c) just before injection into the earth. As a result, barium sulfate is inhibited from precipitating, and the radioactivity of the precipitate or solids produced is substantially less than that observed in a precipitates or solids when the crystal structure modifier is added at fewer points in the brine processing scheme. Surprisingly, this result is observed in process streams where a flocculent is simultaneously added to the clarification zone to enhance the silica settling rate. The observed result of this invention is that some ions and minerals, that would otherwise precipitate, remain in solution while others are simultaneously forced out of solution. It is interesting and unexplained that, despite their normal adverse interactions, neither the flocculent nor the crystal structure modifier seems to interfere with the action of the other on the specifically targeted components of the geothermal stream in this invention.

BRIEF DESCRIPTION OF THE DRAWINGS

Like numbers in the various drawings refer to the same features. In particular, the various items shown in FIG. 1 are shown in FIGS. 2 and 3 with specific preferred components that perform the required functions.

DETAILED DESCRIPTION OF THE INVENTION

The description below describes a process of this invention as used in a geothermal power generating facility. However, the feature of multiple addition of crystal structure modifier before or during the clarifier stage is widely applicable to any process where silicate is removed by precipitation before a waste aqueous stream is injected into the earth.

Figure 1:
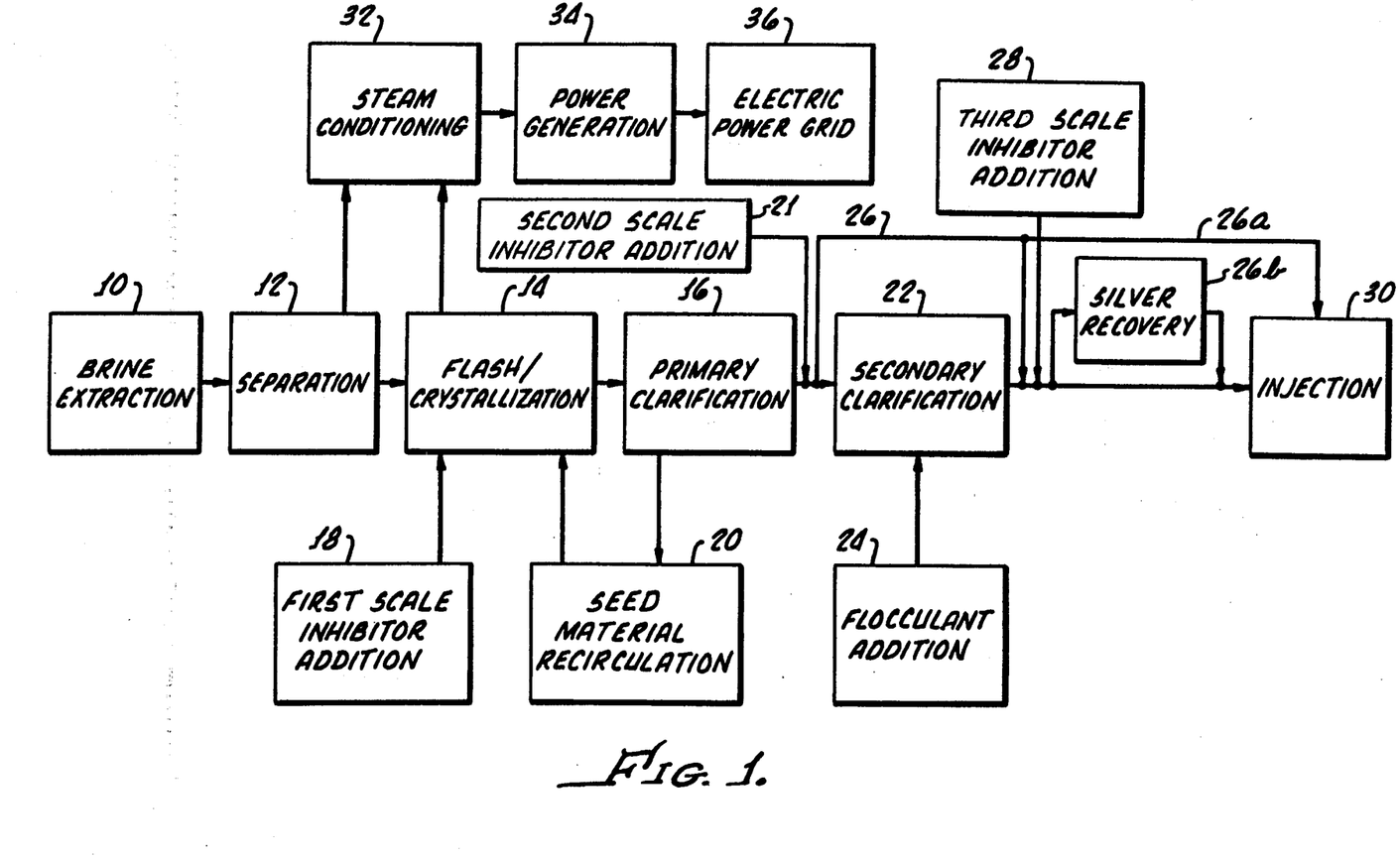
FIG. 1 shows a process flow scheme of a general geothermal plant that uses the process of this invention.

Referring to FIG. 1, hot brine is extracted from the ground at the extraction step 10. The hot extracted brine is introduced to wellhead separation step 12 where steam is generated. The hot liquid brine still remaining flows to a flash crystallization step 14 where more steam is generated, concentrating and cooling the brine even more. The warm liquid brine effluent produced from the flash crystallization step is then pumped to primary clarification step 16 for removing silicon containing components. A first crystal structure modifier addition step 18 introduces a first crystal structure modifier into the primary clarification step 16. A clarification step can be broadly defined as any step in any process where some component of the liquid is allowed to precipitate from the solution while another component is held in solution. In the seed material recirculation step 20 some crystallized material gathered at the primary clarification step 16 back to the flash crystallization step 14.

If the brine effluent from the primary clarification zone 16 is sufficiently free of solids to prevent downstream difficulties, e.g., plugging of injection wells, it may be directed bypassing line 26 around a secondary clarification stage 22. If it is desired to recover silver or other valuable metals, the brine is combined with a third crystal structure modifier 28 to prevent or inhibit fluoride deposition and then passed into a silver recovery process 26b (discussed in more detail hereinafter) followed by injection 30 back into the formation. If silver recovery is not desired, the brine from the primary clarification stage 16 can be passed via lines 26 and 26a directly into injection step 30.

If the solids removal in the primary clarification zone 16 is insufficient, the brine is passed into a secondary clarification zone 22 wherein a flocculent 24 is usually employed to induce precipitation of silicon-containing components. After secondary clarification, one again has the choice of either direct introduction to an injection well or treatment first for recovery of silver or other valuable metals followed by injection.

Power is generated from steam firmed at the wellhead separation step 12 and flash crystallization step 14. The steam is introduced to a steam conditioning step 32 for cleaning. The cleaned steam is used in a power generation step 34 to generate electric power for the electric power grid 36.

In the first crystal structure modifier addition step 18, the second crystal structure modifier addition step 21, and the third crystal structure modifier addition step 28 the same or different crystal structure modifiers may be introduced. "Crystal structure modifier" is a term to describe any additive to a brine stream that will inhibit or prevent any or all species found in the brine from producing a scale or other substantially solid material that settles out of the brine. Crystal structure modifiers, exemplified by phosphonoalkylated amines, apparently interfere with the crystal growth of forming particles. Such particles remain entrained or suspended rather than growing, precipitating and contributing to the formation of scale. The crystal structure modifiers are preferably selected from the group consisting of polyphosphonic acids, phosphonoalkylated amines, aminoalkyl phosphonates, and phosphonocarboxylate. Both pure compounds and mixtures and blends of the compositions listed can be used.

Figure 2:
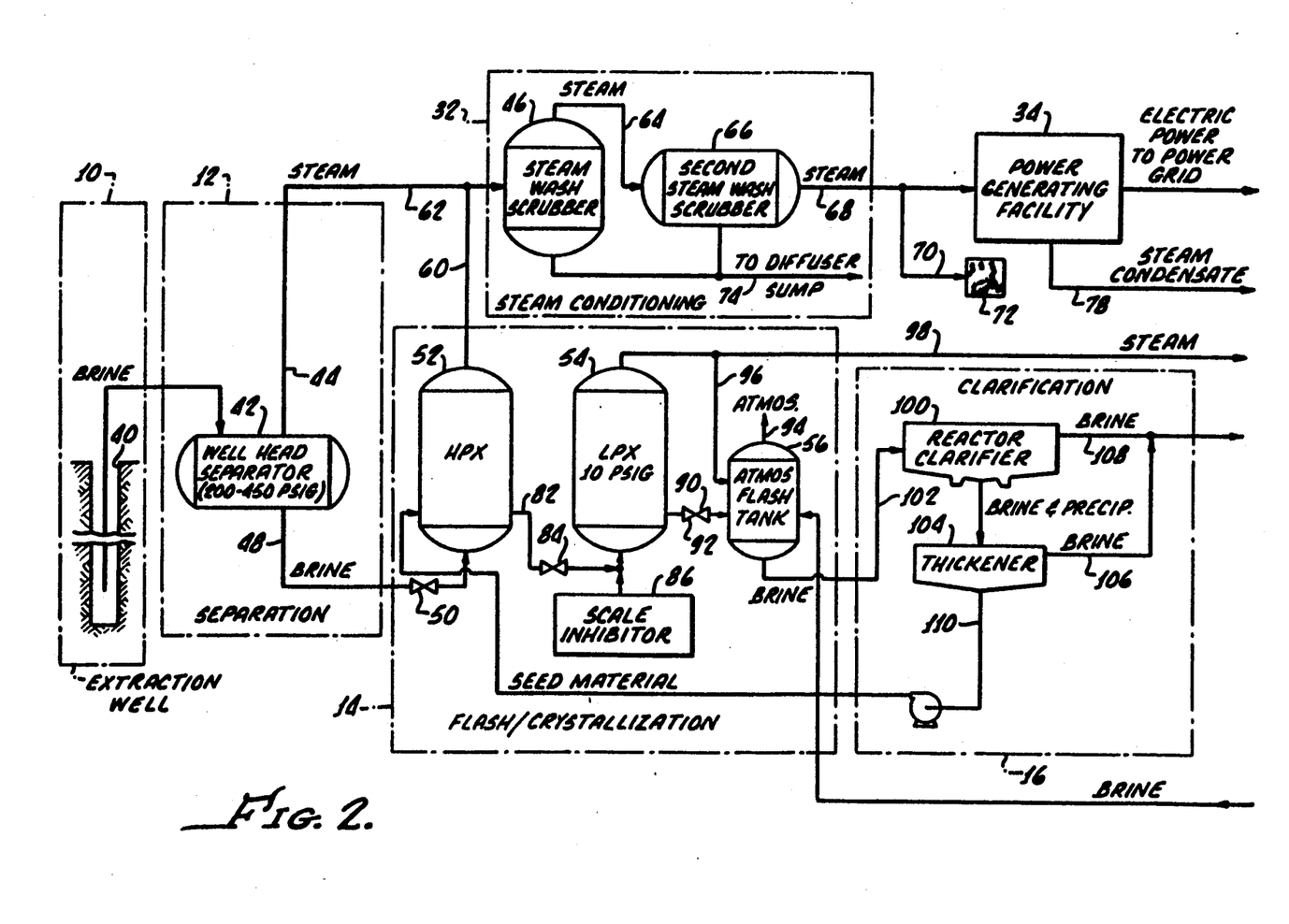
FIG. 2 shows a schematic drawing of one preferred layout.

In a specific preferred embodiment of a power plant shown in FIG. 2, brine and steam from well 40 flow to wellhead separator 42. The steam and brine are typically under pressure of about 200 to 350 psig and a temperature of about 400° F. to 600° F. In the wellhead separator 42, steam and the non-condensible gases are separated from the brine. The steam flows through conduit 44 to the steam scrubber 46. The brine flows from wellhead separator 42 through conduit 48 and past flashing valve 50 into the bottom of a high pressure flash crystallizer (HPX) 52. The liquid remaining in HPX 52 flows to low pressure flash crystallizer (LPX) 54 and an atmospheric flash vessel 56. Steam is produced and silica crystallization initiated at HPX 52, LPX 54 and the atmospheric flash vessel 56.

As the brine is flashed across flashing valve 50 (e.g., from about 450 psig to a reduced pressure of about 120 psig) part of the brine is converted into high energy steam. Within HPX 52, the steam is separated from the brine. As an illustration, HPX 52 can provide about 95,000 pounds of steam per hour in a system extracting about 1.3 million pounds of brine per hour at about 450° F. and a pressure of about 450 psig at the well head separator. This steam flows from HPX 52 through conduit 60 into common steam discharge conduit 62, also receiving steam through conduit 44, to the steam scrubber 46. Partially cleaned steam is discharged from steam scrubber 46, through conduit 64, to second scrubber 66. Clean steam is discharged from second scrubber 66, through conduit 68, to power generating plant 32. In the event the quality of steam discharged through conduit 68 from second scrubber 66 does not meet power generation requirements, for example, as to the level of total dissolved solids, the steam may be vented from conduit 70 to an atmospheric vent apparatus 72, for example, a rock-filled pit.

The mixture of wash water and steam condensate from scrubbers 46 and 66 is discharged through conduit 70 to a diffuser sump 72. Steam condensate is returned for power generating plant 34 through a conduit 78 to a "condensate in" vessel 80 for disposal.

The flashing of the liquid brine in HPX 52 initiates the precipitation of siliceous material and alkaline earth salts. The brine and the precipitating siliceous material suspended in the brine in HPX 52 flow through conduit 82, past flashing valve 84, and into the bottom of LPX 54 at a temperature of about 340° F. It is preferred that the first crystal structure modifier 86 be added to the liquid as soon as the temperature and pressure is such that the alkaline earth metal salts first start to nucleate, which in the process being described is in LPX 54. About 0.5 to 8 ppmw, preferably about 2 to 4 ppmw, of a first crystal structure modifier is added to the brine in conduit 82 before introduction in to LPX 54. As the brine flashes across flashing valve 84 to convert more of the brine into steam, the pressure is reduced further to, for example, about 10 psig. The mixture of brine, steam, and crystal structure modifier is then fed into LPX 54 for separation. For the exemplary brine extraction system described above, the rate at which steam is separated from the brine in LPX 54 may also be about 95,000 pounds per hour. Such additional steam has less energy content than the steam separated in the HPX 52. Within LPX 54, additional silica may be deposited from the brine onto the silica particles entrained in the brine.

The first crystal structure modifier is added via conduit 82 for subsequent introduction into LPX 54. Typically, the crystal structure modifier is added in a concentration between about 0.5 and 12 ppmw, preferably between 0.5 ppmw and 5.0 ppmw, and most preferably between 1.0 and 3.0 ppmw. The preferred crystal structure modifier is typically selected from the phosphonoalkylated amines described in detail hereinafter. Although the crystal structure modifier can be added at other stages in the process, it is preferred to add the first crystal structure modifier as soon as the brine cools enough for the crystal structure modifier to be thermally stable. Preferably, the crystal structure modifier is stable for the amount of time it takes for the brine and the added crystal structure modifier to flow through the remainder of the process, be injected into the earth, and exit the injection well and enter the formation. A brine temperature of less than about 425° F., preferably less than 375° F., and most preferably less than 340° F., in the LPX 54 is cool enough for the addition of the crystal structure modifier without usually encountering any thermal stability problems. The first crystal structure modifier is then carried through the remaining liquid brine processing stages of the power generating facility.

Brine, including the solids suspended in the liquid portion of the brine, and the added crystal structure modifier are discharged from LPX 54 through conduit 90. This brine solution flashes across a third flashing valve 92 in conduit 90, to atmospheric pressure, creating still more steam which is separated from the brine in atmospheric flash tank 56. The additional steam formed has very little energy content and may be discharged from atmospheric flash tank 56, through a conduit 94, into the atmosphere. Alternatively, the steam may be used for facility heating or other heating purposes. To some extent, silica from the brine continues to crystallize from the brine onto the suspended siliceous material in atmospheric flash tank 56.

Processed liquid brine and suspended solids flow from the atmospheric flash tank 56 into the primary clarification zone 16. First they flow to reactor-clarifier 100 through conduit 102. Ordinarily, the brine overflow from thickener 104 is pumped through conduit 106 and combined with brine from reactor-clarifier overflow conduit 108. In one embodiment, the contents of conduit 108 are discharged into the secondary clarification step 22.

Brine from thickener 104 can be recycled back through primary clarification if the suspended solids concentration in the thickener overflow becomes excessive. This might happen, for example, due to settling problems in reactor-clarifier 100. Such settling problems are avoided, in part, by providing a steam blanket for the reactor-clarifier over the brine in the reactor-clarifier. A portion of the brine from thickener 104 is removed through conduit 110 and recirculated back to HPX 52 as seed material to initiate crystallization. Because of this recirculation a small amount of the first crystal structure modifier will be found in HPX 52.

The thickener overflow is greatly diluted by the reactor-clarifier overflow. The dilution occurs because the thickener overflow rate is much smaller than the reactor-clarifier rate. Referring again to the illustrative system, assume the well extracts about 1.3 million pounds of brine per hour. About 130,000 pounds an hour of steam will be generated from the extracted brine. Then, about 1.1 million pounds per hour of the still liquid brine overflows from the reactor-clarifier. But the thickener overflow rate is only about 70 thousand pounds per hour. Consequently, the suspended solids concentration in the thickener overflow is generally comparable with the suspended solids concentration of the reactor-clarifier overflow and is not usually critical.

Figure 3:
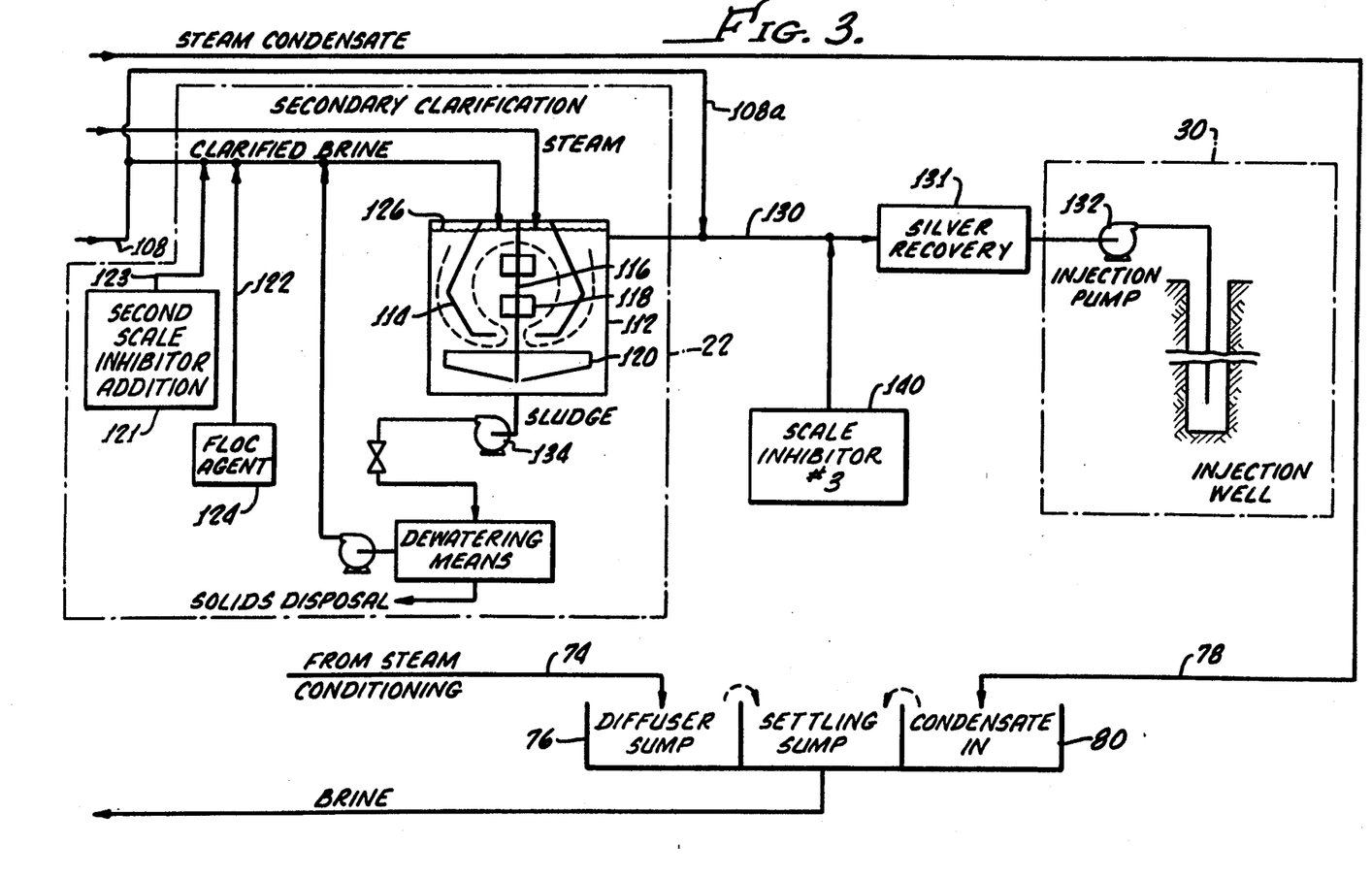
FIG. 3 shows a schematic drawing that is a continuation of the schematic shown in FIG. 2.

Secondary clarifier vessel 112, shown in FIG. 3, has a large internal reaction well 114 in which are mounted, on a vertical shaft 116, at least two rotatably driven mixing blades 118. Below a partially-open bottom of reaction well 114 are rotatably driven scraper blade means 120. Clarified brine effluent from reactor-clarifier 100 flows through conduit 108 into upper regions of secondary clarifier reaction well 114 along with thickener overflow from conduit 106, as described above. The second crystal structure modifier is added from conduit 123 from the second crystal structure modifier tank 121. If added, a flocculent enters through conduit 122 from the flocculent tank 124, after the addition of the second scale inhibitor. A slipstream of steam, from LPX 54, flows through conduit 98 into secondary clarifier vessel upper regions 112 to provide a steam blanket 126 over the surface of the liquid in the secondary clarifier vessel 112. A steam blanket 126 in vessel 112 excludes air from contacting the surface of the liquid contained in the vessel, thereby preventing oxidation of ferrous ions (Fe II) naturally present in the brine to ferric ions (Fe III). This prevents an increase in brine acidification and the corrosion caused by ferric ions. The chemical compatibility of the brine and steam blanket are assured by obtaining the steam used to form the steam blanket from the brine at LPX 54. This prevents possible secondary clarification process upsets.

The second crystal structure modifier is preferably the same as the first crystal structure modifier. It is added in an amount to provide a concentration of between 0.5–2 ppmw, preferably between 0.66–1.5 ppmw, and most preferably between 0.75 and 1.25 ppmw, in the liquid brine stream.

Preferably, flocculent is added to the secondary clarifier to facilitate rapid precipitation of silica. The flocculent is preferably either a cationic, anionic, or non-ionic polyacrylamide (or mixtures thereof) having a high molecular weight, usually above about one million. The preferred flocculent is a cationic flocculent which is present in the secondary clarifier at a concentration of between 0.1 and 1.0 ppmw, preferably between 0.2 and 0.6 ppmw. The flocculent is preferably pumped from flocculent tank 124 through conduit 122 into brine effluent conduit 108, which is connected to the top of vessel 112. The flocculent speeds the precipitation of solids in the secondary clarifier. Within conduit 108, the flocculent is intermixed with the clarified brine overflows from both reactor-clarifier 100 and thickener 104 before the brine is discharged into secondary clarifier vessel 112. The brine and flocculent mixture in conduit 108 flows to secondary clarifier vessel 112. The inflowing mixture is naturally circulated downwardly through reaction well 114, while mixing blades 118 are rotated. Within vessel 112, the solids settled by the flocculent are raked, by means 120, to a solids-brine discharge conduit 134 located at the bottom of the vessel.

Reaction well 114 and vessel 112 are preferably constructed to provide a brine residence time in the reaction well between about 10 and about 20 minutes and to provide a total vessel brine residence time between about 45 and 150 minutes. Such residence times enable the fine residual solids suspended to be effectively flocculated and permit the flocculated material to settle to the bottom of vessel 112. More preferably, to minimize vessel size, the brine residence times in reaction well 114 and vessel 112 are respectively about 10 minutes and about 45 minutes. The preferred residence time results in the secondary clarified brine overflow preferably containing less than about 20 parts per million suspended solids, with the mean particle size being between about 3 and about 4 microns.

The discharged brine from vessel 112 flows through overflow conduit 130. The third crystal structure modifier is added to the brine overflow conduit 130. Between 1–6 ppmw crystal structure modifier, preferably between 2-5 ppmw, and most preferably between 2.5–4.0 ppmw, is added. Preferably, the third crystal structure modifier is the same as the first and second crystal structure modifiers. The secondary clarified brine then flows through a line mine 13 1 or directly to an injection means. The preferred line mine is a section of pipe into which is placed coiled chicken wire. The line mine encourages the early precipitation of various components of the brine before injection. In this manner the more troublesome components do not precipitate out inside the injection well.

After the deposition of silver and/or other metal values, the effluent from the line mine is then disposed of by injection into the earth. The effluent flows to injection pump 132. Injection pump 132 then pumps the brine into the earth in injection well.

As the brine is processed, prior to the clarification stages, some dissolved ions and minerals become supersaturated. The silicates, in particular, become supersaturated, but do not quickly settle out of solution. The resulting suspended silicate particles are difficult to flocculate in the clarifiers for two reasons. First, the suspended particles in the brine are present only in a low concentration. Second, the particles typically are of small size. For example, the brine might contain a concentration of about 150 parts per million of particles having a mean size of about 4 or 5 microns. However, surprisingly, adding flocculent in large amounts (even if one could use such amounts economically) retards rather than speeds the particle flocculation rate of the brine within vessel 112. It is believed that the use of flocculent in large amounts may cause the flocculent ions to repel each other, resulting in the observed retarding effect.

The particulate flocculation rate is also observed to be retarded if the brine flocculent mixing or circulation rate is increased (for example, by the faster rotation of mixer blades 118). This unexpected effect is possibly due to the increased agitation rupturing molecular bonds in the long-chain flocculent molecules. It has been observed that flocculents have little or no effect on the amount of radioactivity or fluoride ion present in precipitated or scaled solids.

NORMs in precipitated solids present problems in the operation of geothermal power plants. The precipitation of NORMs ions can be inhibited by adding to the brine a crystal structure modifier. It has been found that a crystal structure modifier comprising a crystal structure modifier preferentially prevents the deposition of both barium sulfate and NORMs. Therefore, it is greatly preferred to use a crystal structure modifier at least three times in a geothermal brine stream to prevent the crystals that form from growing to a size where they will precipitate. Preferably, the crystal structure modifier selected reduces the concentration of NORMs in all solids produced throughout the system by at least about 33% from what is observed before addition. More preferably, the concentration of NORMs is reduced at least about 50%. Most preferably, the amount of radiation emitted from any precipitate recovered in a process using this invention will be no more than the standard background radioactivity.

It is unexplained why a crystal structure modifier should inhibit some dissolved solids from precipitating in a system where a flocculent is simultaneously used to accelerate the rate of precipitation of other solids. However, it is observed that adding a crystal structure modifier to the cooling brine causes some minerals and ions to remain in solution, while the rate of precipitation of other solids is accelerated by the simultaneous addition of a flocculent. Crystal structure modifiers can be selected from the group consisting of polyphosphonic acids, phosphonoalkylated amines, aminoalkyl phosphonates, phosphate esters, phosphonocarboxylate, and mixtures and blends of the compositions listed. The preferred crystal structure modifiers are selected from the group consisting of phosphono-alkylated amines and aminoalkyl phosphonates.

A crystal structure modifier can be added to the brine stream in a number of places in a geothermal plant. The preferred locations are selected primarily on the basis of temperature. The temperature at the location of addition must be low enough that the crystal structure modifier does not rapidly thermally degrade. The crystal structure modifier is preferably added at the LPX step 54, before the second clarification step, and just before the injection step 30. However, since crystal structure modifiers are thermally sensitive, if the addition temperature is too hot, the crystal structure modifier will degrade. Therefore, preferably, the brine temperature at each point of crystal structure modifier addition will be cool enough to prevent thermal degradation of the crystal structure modifier for the amount of time required before the brine is injected back into the earth. It is preferred that the crystal structure modifier be added to brine at a temperature less than about 400° F., preferably less than about 370° F., and most preferably less than about 340° F.

The crystal structure modifier must be added to the brine in an effective concentration, generally, at a rate sufficient to produce total concentrations of crystal structure modifiers in the brine between about 0.5 and 50 ppmw, preferably between about 1 and 10 ppmw, and most preferably between about 2 and 8 ppmw.

The preferred flocculents have the repeating structure represented by formula (1):

where $x = 10,000$ to $25,000$.

The individual effects of crystal structure modifiers and flocculents are very different with the difference and the magnitude of difference being highly unexpected. Their influence on particles in solution is directly opposite. In the usual mode of operation of this invention, the crystal structure modifier is added both before and after the flocculent. When the crystal structure modifier is added upstream of the clarifier stages and it is observed not to interfere with the action of the flocculent. Likewise, when the crystal structure modifier is added downstream of the flocculent, there is no observed interference caused by the flocculent on the action of the crystal structure modifier. Why the two classes of compounds have such different and exclusive effects in the same system remains a mystery.

The preferred crystal structure modifier has the structure, represented by phosphonoalkylated amines, shown in formula (2):

where $R^1$, $R^2$, and $R^3$ are the same or different and are (a) lower alkylene or (b) $NR^5R^6$, where $R^5$ and $R^6$ are the same or different, and $R^5$ can be a lower alkyl radical, hydrogen atom, or $R^7PO_3H_2$ (where $R^7$ is a lower alkylene radical), and $R^6$ can be a lower alkyl radical, a hydrogen atom, $(NR^8)_z$, where $R^8$ is defined the same as $R^5$ and $z$ is 1 to about 10, or $R^7PO_3H_2$ (where $R^7$ is a lower alkylene radical). All references to lower alkyl or lower alkylene refers to alkyl or alkylene radicals having from one to ten carbon atoms, preferably between one and six carbon atoms. At least one of $R^1$, $R^2$, $R^3$, $R^5$, $R^6$, $R^7$, or $R^8$ are a lower alkylene group. The various salts, for example, sodium and potassium salts, are also included. One presently preferred compound is phosphonomethyl amine, that is $R^1$, $R^2$, and $R^3$ are all methylene groups.

The structure of a second class of preferred crystal structure modifiers included in formula (2) is shown in formula (3):

where $R^{10}$, $R^{11}$, $R^{12}$, $R^{13}$, $R^{13}$, $R^{15}$ and $R^{16}$ are the same or different and are lower alkylene, where lower alkylene is the same as previously described. The various salts, for example, sodium and potassium salts, are also included.

It will of course be appreciated that the most economical crystal structure modifiers, and flocculents are technical grade compositions. Usually these compositions contain large amounts of components (e.g., inert ingredients) not described above. Cost considerations aside, it would be preferred to use pure compounds in the method of this invention. However, the technical grade compositions commercially available are useful in the method of the present invention. The concentration of active ingredients in any particular commercially available material is not generally important. It is only necessary that enough of the material be used to produce the desired concentration of the active ingredient in the brine. Preferably, however, the material will contain at least about 33 wt % of the active ingredients. It is especially preferred that the material contain more than about 50 wt % of the active ingredients.

EXAMPLES

The invention is further described by the following examples, which are illustrative of various aspects of the invention and are not intended as limiting the scope of the invention as defined by the appended claims.

Example 1

Figure 5:
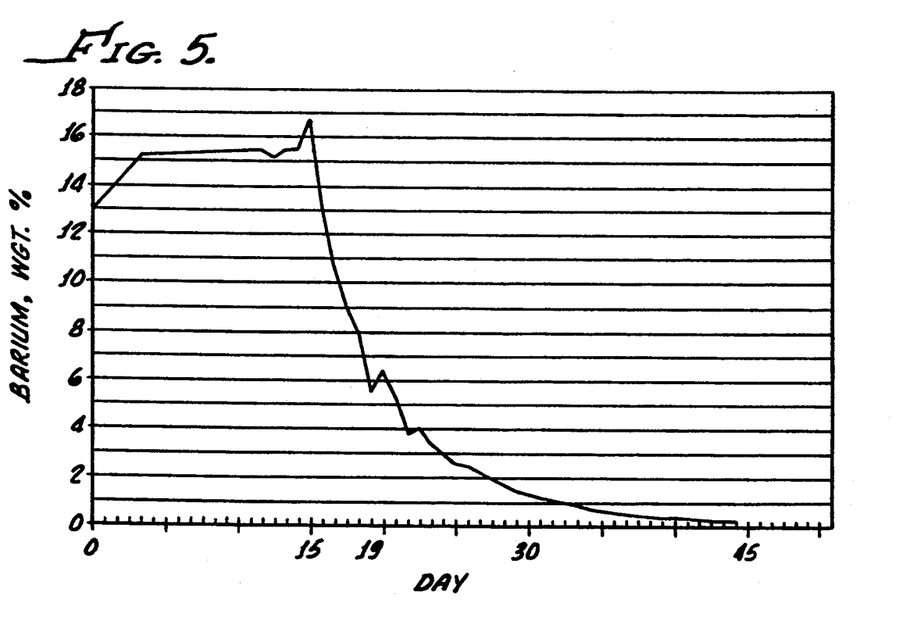
FIG. 5 shows a graphical representation of barium concentration versus day number using the method of the present invention.
Figure 6:
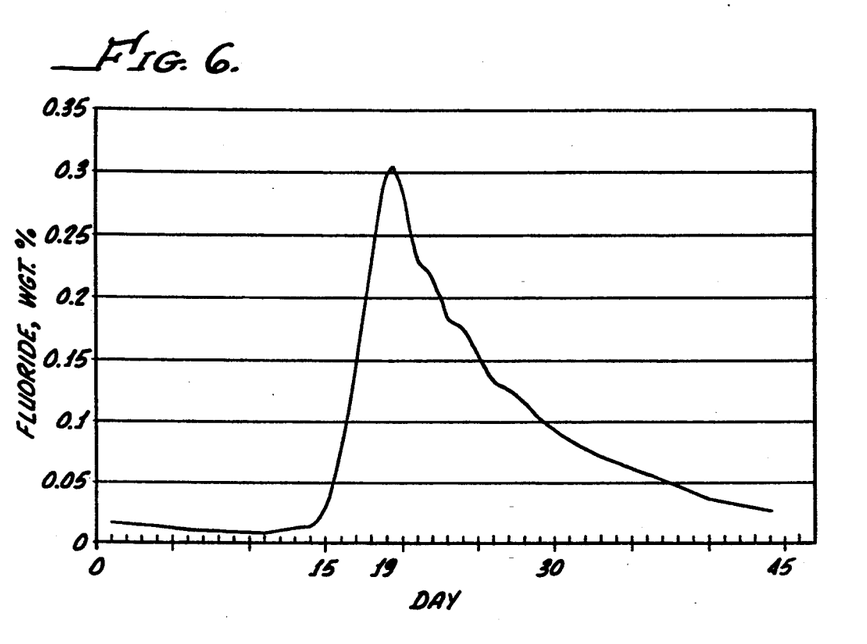
FIG. 6 shows a graphical representation of fluoride concentration versus day number after using the method of the present invention.

In this example, a crystal structure modifiers was tested for efficacy at removing radioactivity from a geothermal brine after a dispersant had been tested in the same brine. The dispersant was a polyacrylate crystal structure modifier added continuously to the brine at the LPX to give a constant concentration of 8 ppmw in the brine. Although the results of addition of the first crystal structure modifier had been tested for many days, only the last fifteen days data are recorded graphically as days one through fifteen on FIGS. 4 through 6. The addition of a polyacrylate crystal structure modifier was stopped at day fifteen and no crystal structure modifier of any kind was added for the next four days. On day nineteen, the addition of phosphonomethyl amine, sold under the brand name 3919 by Nalco Chemical Co., was commenced. Enough phosphonomethyl amine was continuously added to give a constant concentration of 8 ppmw in the effluent from the HPX.

Filter cake produced by the geothermal facility was analyzed. The concentrations of sulfur, barium, and fluoride and the amount of gamma radiation known to be produced by $Ra^{226}$ were measured daily and the value for each day plotted on the Figures. The variation in the concentrations of sulfur values is graphically depicted in FIG. 4, the variation of barium in FIG. 5, the variation of fluoride in FIG. 5, and the variation of $Ra^{226}$ radioactivity in FIG. 6. In each Figure, the effect of the crystal structure modifier on the concentration of the material followed is shown by the data for the first fifteen days, the effect of adding nothing is shown for the next four days, creating a sort of base line, and the effect of adding the crystal modifier is shown by the data for the last thirty days.

Figure 4:
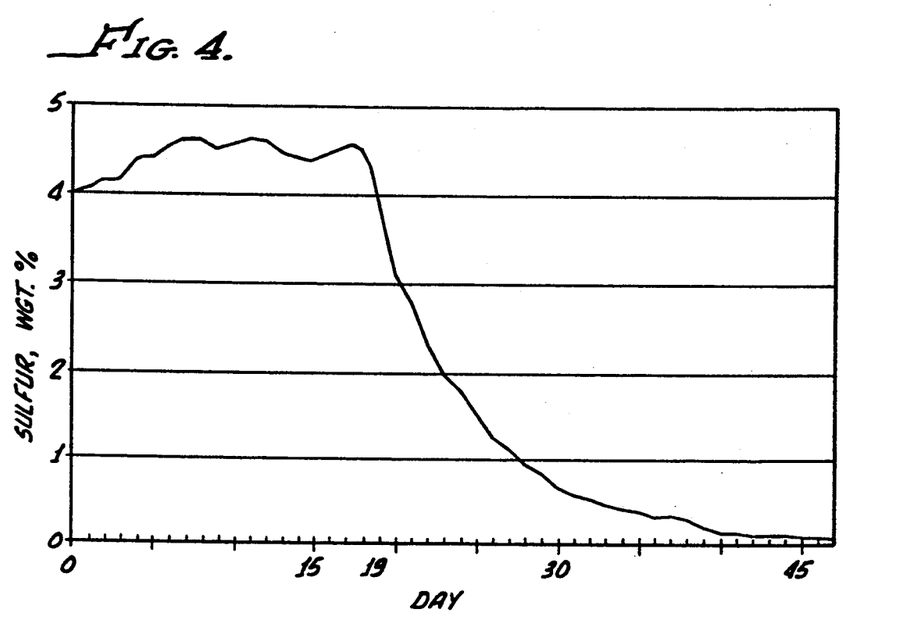
FIG. 4 shows a graphical representation of sulfur concentration versus day number using the method of the present invention.

Most of the sulfur in the scale is present as barium sulfate. Therefore, the concentration of sulfur values in the filter cake is directly related to the concentration of barium. Referring to FIG. 4, it can be seen that the concentration of sulfur (as measured by Leco Model SC132 resistance furnace method) in the cake rose during the first 15 days of the test. Likewise, referring to FIG. 5, the concentration of barium rose for the first fifteen days. The concentrations of sulfur and barium in the cake did not change very much during the four day changeover period. Therefore, one can conclude that the addition of polyacrylate had little effect on the amount of sulfur precipitated. One day after the start of the addition of the phosphonomethylated amine, the concentration of sulfur in the filter cake started to plummet. The phosphonomethylated amine strongly inhibited the precipitation of sulfur values. Phosphonomethylated amines are extremely good at inhibiting the precipitation of both barium and sulfur, as sulfate.

Figure 7:
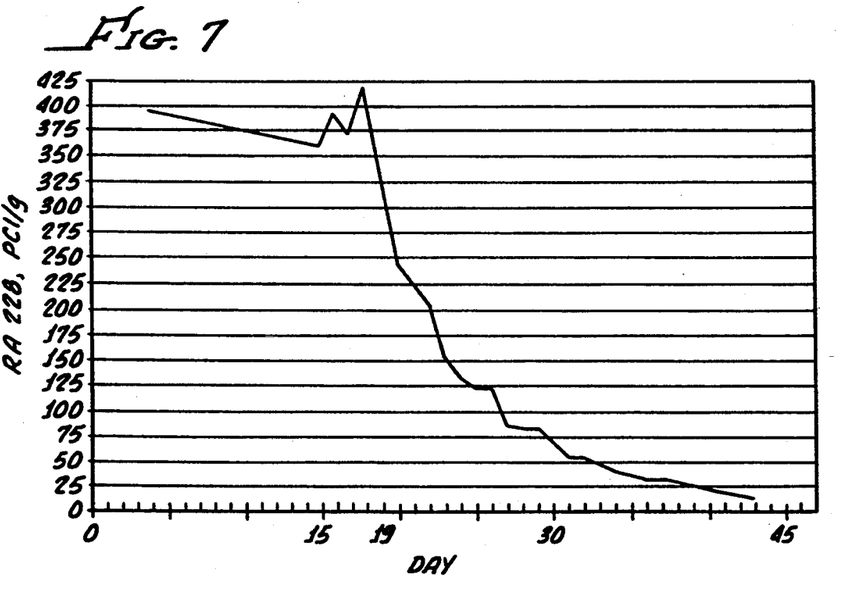
FIG. 7 shows a graphical representation of $Ra^{226}$ concentration versus day number after using the method of the present invention.

Radioactivity was measured by detecting gamma ray emissions known to emanate from $Ra^{226}$. In this Example, the total amount of radioactivity in the filter cake is assumed to be directly related to the amount of $Ra^{226}$ detected. Referring to FIG. 7, the amount of radioactivity in the filter cake during the first 15 days was relatively high. It did not increase substantially during the four day changeover period. One day after the start of the addition of the phosphonomethylated amine, the amount of radioactivity detected started to plummet. The phosphonomethylated amine crystal structure modifier was extremely good at lowering the amount of radioactivity in the filter cake and better at controlling the concentration of $Ra^{226}$ in the filter cake than the crystal structure modifier. Since it is currently believed most of the NORMs that are not $Ra^{226}$ are other chemically virtually indistinguishable isotopes of radium, one concludes that the phosphonomethylated amines are effective at controlling total radioactivity in the filter cake.

Example 2

The superior action of triple injections of crystal structure modifier compared to single and double injections is shown in this example. It should be noted that although the waste water pumped down the well of FIG. 8 was from the same source as that shown in FIG. 9, not all the water of FIG. 9 was pumped down the particular well of FIG. 8.

Figure 8:
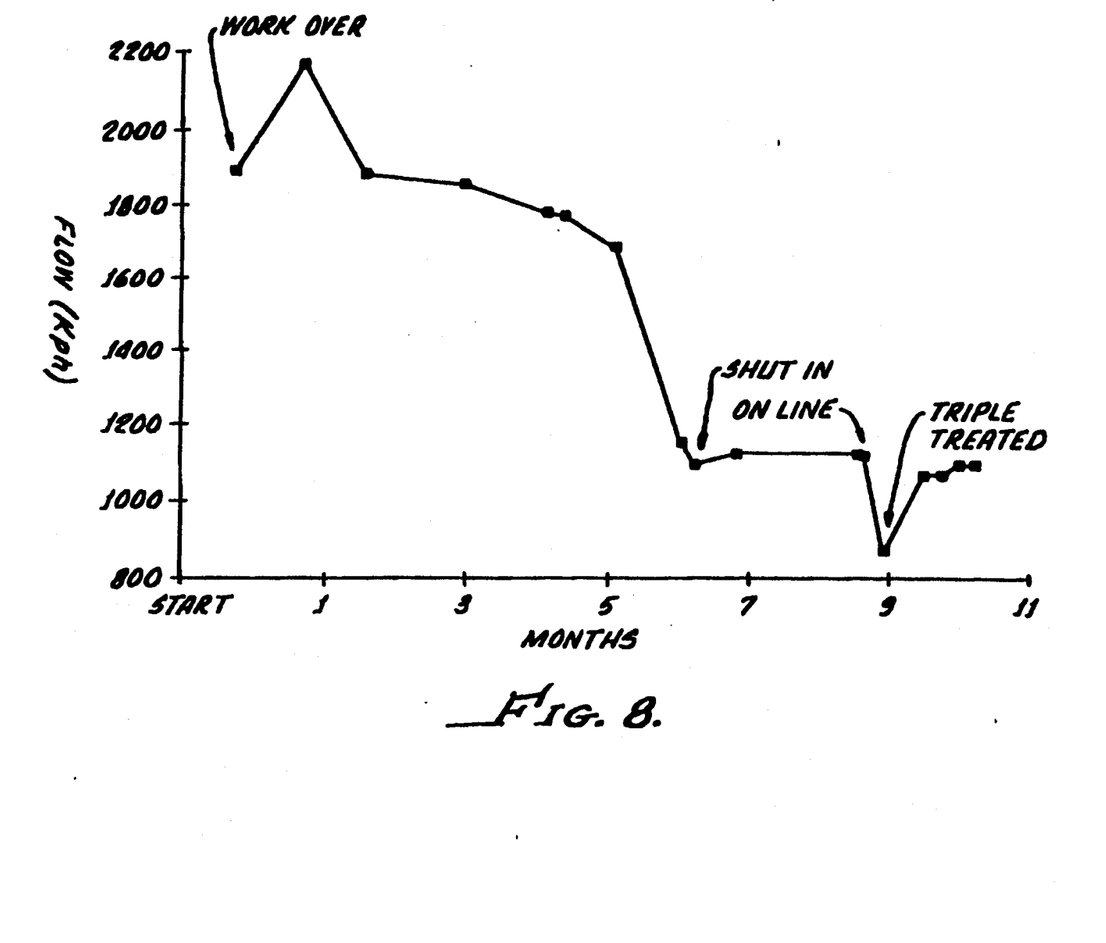
FIG. 8 shows a graphical representation of the flow rate into an injection well over a period of time.

Referring to FIG. 8, the flow rate of an injection well that had been worked over is shown. The flow rate of waste water treated with single injections of crystal structure I₀modifier started at about 2200 Kph at month 1, and the flow rate slowly declined until month 4 when it inexplicably started to plummet. The well was shut in and reworked a second time. When the well was reactivated, the waste water injectate was the product of the dual injection system. The productivity of the well continued to plummet. The well was first treated with a chemical to dissolve the scale down hole, then the triplely treated waste water was pumped down hole. For the first time in the history of the Salton Sea geothermal operation run by UNOCAL, a fully broken-in well the injection rate slowly increased as the triplely treated waste water entered the well.

Figure 9:
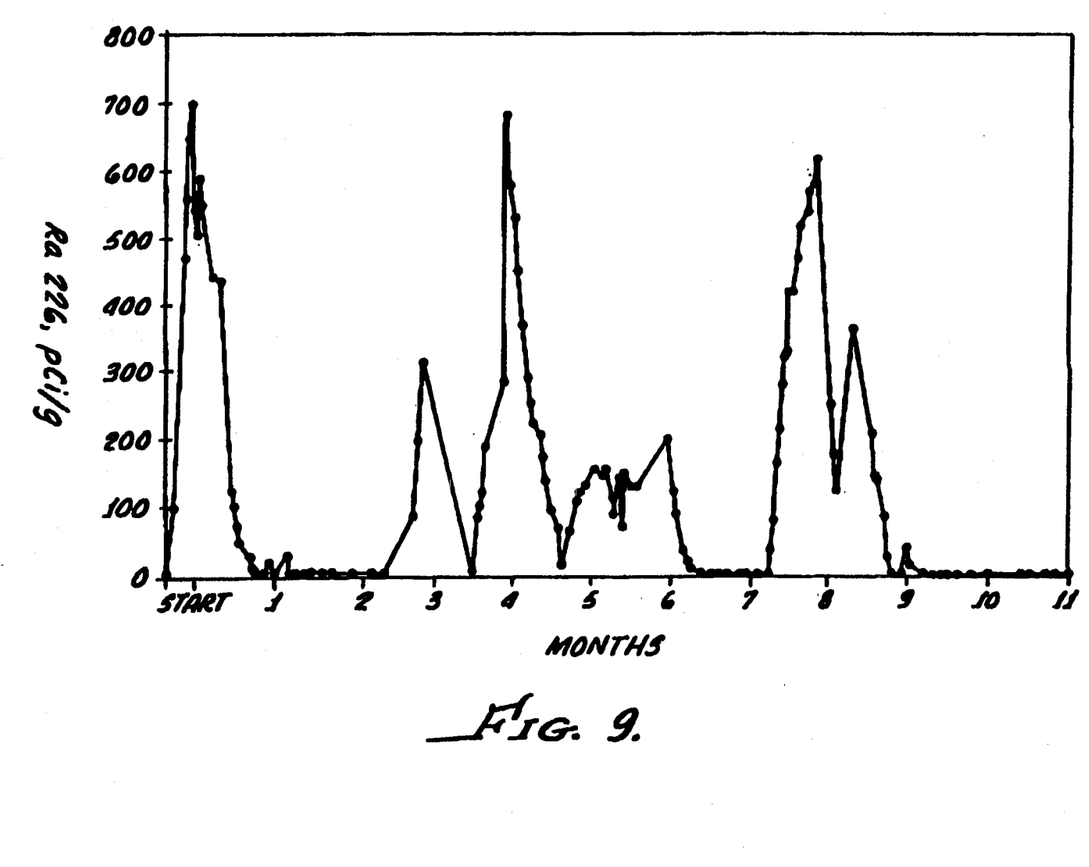
FIG. 9 shows a graphical representation of the amount of radioactivity detected from $Ra^{226}$ over a period of time.

Referring to FIG. 9, the waste water treated had the amount of NORMs measured (as $Ra^{226}$) versus time. It can be seen that the amount of NORMs detected from time to time was highly variable. In particular, at the beginning of the single point injection the NORMs concentration had increased substantially. The dual injection brought the concentration of the NORMs down somewhat, but soon the concentration started increasing again. Then the triple injection started and the concentration of NORMs started to decrease and stayed essentially at the baseline. This represents the best control of NORMs for the longest time ever observed for the waste water prior to injection.

The data of the two Figures taken together shows that the concentration of NORMs and the associated scale produced down hole can be satisfactorily redriced. The material that remains on the surface is essentially NORMs free and the injection wells that receive the waste water have unexpectedly prolonged lives.

Because the crystal modifier (e.g., the phosphonoamine) inhibits the deposition of NORMs and alkaline earth sulfates, one unique feature and advantage in the invention is the amount of deposits produced in the clarification stages is substantially reduced. In one geothermal facility, the amount of solids produced in the clarification stages was reduced by 40% by weight (from about 45 tons per day to about 27 tons per day, based on the total solids produced in the primary and secondary clarifiers). In addition to facilitating the handling of far less solids, the solids produced can be readily used for other purposes. This latter result is a direct result of the fact that the solids, due to the method of the invention, contain only innocuous proportions of NORMs. Thus, the invention provides a method for decreasing solids production in the clarification stages, e.g., by at least 20%, preferably by at least 30%, and most preferably by at least 40%, while simultaneously providing commercially useful solids, e.g., as a component for producing concrete. In addition, the invention improves the efficiency of the clarification stages by more selectively removing the agents which are known to plug injection wells rapidly (i.e., silicon-containing components) while keeping the NORMs and alkaline earth sulfates either dissolved or in suspension. It should also be noted that a cationic flocculent is particularly preferred for use in the secondary clarifier in those embodiments in which a phosphonoamine is used to inhibit NORMs and alkaline earth deposition. Some anionic flocculents have been found to be ineffective in the presence of phosphonoamines. Finally, it is emphasized that the crystal structure modifier is most preferably first added in the approximate region where barium sulfate first begins to nucleate. The second addition of a crystal structure modifier is added just before or at the silica precipitation step. The third addition step, if used, is after the silica removal step and before the injection step since it is most preferred to stop the growth of the barium sulfate crystals when they are of only microscopic size, and keep them from continuing to grow again before the brine is in the formation receiving the injection solution.

Although this invention has been primarily described in terms of specific examples and embodiments thereof, it is evident that the foregoing description will suggest many alternatives, modifications, and variations to those of ordinary skill in the art. Accordingly, the appended claims are intended to embrace as being within the spirit and scope of invention, all such alternatives, modifications, and variations.

What is claimed is:

1. A method for treating an aqueous liquid substantially derived from the earth, said liquid containing one or more silicon-containing components, an alkaline earth component, and naturally occurring radioactive materials, comprising:
   (1) adding at least about 0.5 ppmw crystal structure modifier to the aqueous liquid;
   (2) then introducing said aqueous liquid into a clarification zone wherein a flocculating agent for inducing silicon components contained in the aqueous liquid to precipitate;
   (3) adding a second amount of crystal structure modifier to the aqueous liquid during step (2) sufficient to inhibit precipitation of a substantial portion of naturally occurring radioactive materials originally contained in said aqueous liquid; and (4) recovering from said clarification zone a clarified aqueous liquid of substantially reduced content of silicon-containing components but containing a substantial proportion of the naturally occurring radioactive materials originally contained in said aqueous liquid.

2. The method of claim 1 wherein the crystal structure modifier in steps (1) and (3) have the same composition.

3. The method of claim 2 wherein the crystal structure modifier is a phosphono-alkylated-amine.

4. A method as defined in claim 3 wherein the phosphono-alkylated-amine has the following formula: (2)

where $R^1$, $R^2$, and $R^3$ are the same or different and are (a) lower alkylene or (b) $NR^5R^6$, where $R^5$ and $R^6$ are the same or different, and $R^5$ comprises a lower alkyl radical, hydrogen atom, or $R^7PO_3H_2$ (where $R^7$ is a lower alkylene radical), and $R^6$ comprises a lower alkyl radical, a hydrogen atom, $(NR^8)_z$, where $R^8$ is defined the same as $R^5$ and z is 1 to about 10, or $R^7PO_3H_2$ (where $R^7$ is a lower alkylene radical), where at least one of $R^1$, $R^2$, $R^3$, $R^5$, $R^6$, $R^7$, or $R^8$ are a lower alkylene group, and lower alkyl and lower alkylene refers to alkyl and alkylene radicals having from one to ten carbon atoms.

5. A method as defined in claim 3 wherein the phosphono-alkylated-amine has the following formula: (3)

where $R^{10}$, $R^{11}$, $R^{12}$, $R^{13}$, $R^{14}$, $R^{15}$ and $R^{16}$ are the same or different and are lower alkylene, and lower alkylene refers to alkylene radicals having from one to ten carbon atoms.

6. A method as defined in claim 3 wherein at least 33% of the naturally occurring radioactive materials in the aqueous liquid are also contained in said clarified aqueous liquid.

7. A method as defined in claim 3 wherein said flocculating agent is cationic.

8. A method as defined in claim 3 wherein aqueous liquid contains one one or more metal values, and said method further comprises:

recovering said one or more metal values while inhibiting the contamination of said metal values with fluorides by adding a crystal structure modifier.

9. A method as defined in claim 2 wherein said flocculating agent is a cationic component having the following repeating formula structure:

where x = 10,000 to 25,000.

10. A method for treating a waste stream from a geothermal brine for injection into the earth, said brine containing one or more silicon-containing components, an alkaline earth component, and naturally occurring radioactive materials comprising:

(1) adding at least about 0.5 ppmw crystal structure modifier to the brine;

(2) introducing said brine into a clarification zone;

(3) introducing a second amount of a crystal structure modifier to the brine at step (2) sufficient to inhibit precipitation of a substantial proportion of naturally occurring radioactive materials originally contained in said feed geothermal brine;

(4) adding a flocculating agent to induce silicon-containing components contained in the geothermal brine to precipitate in the clarification zone;

(5) recovering from said clarification zone a product geothermal brine of substantially reduced content of silicon-containing components but containing a substantial proportion of the naturally occurring radioactive materials originally contained in said geothermal brine;

(6) introducing into said product geothermal brine a third amount of crystal structure modifier to form a waste stream; and (7) injecting the waste stream into the earth.

11. The method of claim 10 wherein the crystal structure modifiers of steps (1), (3), and (6) are the same.

12. A method as defined in claim 11 wherein the crystal structure modifier has the following formula: (2)

where $R^1$, $R^2$, and $R^3$ are the same or different and are (a) lower alkylene or (b) $NR^5R^6$, where $R^5$ and $R^6$ are the same or different, and $R^5$ comprises a lower alkyl radical, hydrogen atom, or $R^7PO_3H_2$ (where $R^7$ is a lower alkylene radical), and $R^6$ comprises a lower alkyl radical, a hydrogen atom, $(NR^8)_z$, where $R^8$ is defined the same as $R^5$ and z is 1 to about 10, or $R^7PO_3H_2$ (where $R^7$ is a lower alkylene radical), where at least one of $R^1$, $R^2$, $R^3$, $R^5$, $R^6$, $R^7$, or $R^8$ are a lower alkylene group, and lower alkyl and lower alkylene refers to alkyl and alkylene radicals having from one to ten carbon atoms.

13. A method as defined in claim 11 wherein the crystal structure modifier has the following formula: (3)

where $R^{10}$, $R^{11}$, $R^{12}$, $R^{13}$, $R^{14}$, $R^{15}$ and $R^{16}$ are the same or different and are lower alkylene, and lower alkylene refers to alkylene radicals having from one to ten carbon atoms.

14. A method as defined in claim 11 wherein at least 33% of the naturally occurring radioactive materials in the feed aqueous liquid are also contained in said clarified aqueous liquid.

15. A method as defined in claim 11 wherein said flocculating agent is cationic.

16. A method as defined in claim 11 wherein said geothermal brine contains one or more metal values, and said method further comprises:
recovering said one or more metal values while inhibiting the contamination of said metal values with fluorides by adding a crystal structure modifier.

17. A method as defined in claim 11 wherein said geothermal brine contains one or more metal values, and said method further comprises:
recovering said one or more metal values while inhibiting the contamination of said metal values with fluorides by adding a crystal structure modifier.

18. A method as defined in claim 17 wherein:
(1) said recovering comprises passing said clarified aqueous liquid through a conduit containing chicken wire, with at least some of said residual silicon-containing components and at least some of said metal values including one or more silver components depositing on said chicken wire, and
(2) the clarified aqueous liquid after said recovering of metal values is injected into the earth.

19. A method as defined in claim 11 wherein said flocculating agent is a cationic component having the following repeating formula structure:

where x=10,000 to 25,000.

20. A method for treating an aqueous liquid produced from the earth before disposal by injection into the earth, said liquid containing one or more non-alkaline earth components, an alkaline earth component, and naturally occurring radioactive materials, comprising:

(1) adding at least about 0.5 ppmw crystal structure modifier to the liquid;

(2) adding a flocculating agent to induce silicon-containing components in the liquid to precipitate in a clarification zone;

(3) adding a second amount of crystal structure modifier to the aqueous liquid in step (2) sufficient to inhibit precipitation of a substantial proportion of naturally occurring radioactive materials originally contained in said feed aqueous liquid;

(4) removing a clarified aqueous liquid from the clarification zone containing a substantially reduced concentration of silicon-containing components but containing a substantial proportion of the naturally occurring radioactive materials originally contained in said feed aqueous liquid; and (5) introducing into the clarified aqueous liquid a crystal structure modifier.

21. The method of claim 20 wherein the crystal structure modifier of steps (1), (3), and (5) is a phosphono-alkylated-amine.

22. A method as defined in claim 21 wherein the phosphono-alkylated-amine has the following formula: (2)

where $R^1$, $R^2$, and $R^3$ are the same or different and are (a) lower alkylene or (b) $NR^5R^6$, where $R^5$ and $R^6$ are the same or different, and $R^5$ comprises a lower alkyl radical, hydrogen atom, or $R^7PO_3H_2$ (where $R^7$ is a lower alkylene radical), and $R^6$ comprises a lower alkyl radical, a hydrogen atom, $(NR^8)_z$, where $R^8$ is defined the same as $R^5$ and z is 1 to about 10, or $R^7PO_3H_2$ (where $R^7$ is a lower alkylene radical), where at least one of $R^1$, $R^2$, $R^3$, $R^5$, $R^6$, $R^7$, or $R^8$ are a lower alkylene group, and lower alkyl and lower alkylene refers to alkyl and alkylene radicals having from one to ten carbon atoms.

23. A method as defined in claim 21 wherein the phosphono-alkylated-amine has the following formula: (3)

(3)

where $R^{10}$, $R^{11}$, $R^{12}$, $R^{13}$, $R^{14}$, $R^{15}$ and $R^{16}$ are the same or different and are lower alkylene, and lower alkylene refers to alkylene radicals having from one to ten carbon atoms.

24. A method as defined in claim 21 wherein at least 33% of the naturally occurring radioactive materials in the feed aqueous liquid are also contained in said clarified aqueous liquid.

25. A method of disposing a waste aqueous liquid produced from the earth before disposal by injection into the earth, said waste aqueous liquid containing both silicon-containing components, an alkaline earth component, and naturally occurring radioactive materials, comprising:

(1) adding at least about 0.5 ppmw crystal structure modifier to the liquid;

(2) introducing said liquid into a clarification zone;

(3) introducing a crystal structure modifier to the aqueous liquid in step (2) sufficient to inhibit precipitation Of a substantial amount of a naturally occurring radioactive material in the waste aqueous liquid;

(4) adding a flocculating agent to the liquid in the clarification zone to induce silicon-containing components to precipitate in the clarification zone;

(5) removing a clarified aqueous liquid from the clarification zone, said liquid containing a substantially reduced content of silicon-containing components but substantially the same amount of naturally occurring radioactive materials as the waste aqueous liquid;

(6) introducing into the clarified aqueous liquid a crystal structure modifier; and (7) injecting the clarified aqueous liquid into the earth.

26. The method of claim 25 wherein the crystal structure modifiers of steps (1), (3), and (6) are the same.

27. A method as defined in claim 26 wherein the crystal structure modifier has the following formula: (2)

(2)

where $R^1$, $R^2$, and $R^3$ are the same or different and are (a) lower alkylene or (b) $NR^5R^6$, where $R^5$ and $R^6$ are the same or different, and $R^5$ comprises a lower alkyl radical, hydrogen atom, or $R^7PO_3H_2$ (where $R^7$ is a lower alkylene radical), and $R^6$ comprises a lower alkyl radical, a hydrogen atom, $(NR^8)_z$, where $R^8$ is defined the same as $R^5$ and z is 1 to about 10, or $R^7PO_3H_2$ (where $R^7$ is a lower alkylene radical), where at least one of $R^1$, $R^2$, $R^3$, $R^5$, $R^6$, $R^7$, $R^8$ or are a lower alkylene group, and lower alkyl and lower alkylene refers to alkyl and alkylene radicals having from one to ten carbon atoms.

28. A method as defined in claim 26 wherein the crystal structure modifier has the following formula: (3)

(3)

where $R^{10}$, $R^{11}$, $R^{13}$, $R^{14}$, $R^{15}$ and $R^{16}$ are the same or different and are lower alkylene, and lower alkylene refers to alkylene radicals having from one to ten carbon atoms.

29. A method as defined in claim 26 wherein said flocculating agent is a cationic component having the following repeating formula structure:

where x = 10,000 to 25,000.

30. A method for treating an aqueous liquid substantially derived from the earth, said liquid containing a silicon-containing component and an alkaline earth component, comprising:
adding a crystal structure modifier and a flocculating agent to the liquid in concentrations effective to both 1) inhibit the precipitation of the alkaline earth component and the naturally occurring radioactive material in the aqueous liquid, and 2) facilitate the precipitation of the silicon-containing component; and
recovering from said liquid substantial amounts of the silicon-containing precipitate prior to disposal of said liquid.

31. The method of claim 30 wherein the concentration of said flocculating agent is at least about 0.1 ppmw and at least of portion of said adding step is prior to said recovering step.

* * * * *

UNITED STATES PATENT AND TRADEMARK OFFICE
CERTIFICATE OF CORRECTION

PATENT NO. : 5,409,614
DATED : April 25, 1995
INVENTOR(S) : Gallup et al.

It is certified that error appears in the above-indentified patent and that said Letters Patent is hereby corrected as shown below:

Column 20, claim 27, line 18, delete $R^8$ or" and replace with -- or $R^8$ --.

Column 20, claim 28, line 42, after "$R^{11}$" and before "$R^{13}$" insert -- $R^{12}$ --.

Column 20, claim 30, line 55, delete "and"; line 56, after "component" and before ",comprising", insert -- and naturally occurring radioactive mateirals --; line 60, delete "material" and replace with -- materials --.

Signed and Sealed this

Fifteenth Day of August, 1995

Attest:

BRUCE LEHMAN

Attesting Officer    Commissioner of Patents and Trademarks